United States Patent [19]
Wydeven et al.

[11] 4,303,961
[45] Dec. 1, 1981

[54] USE OF GLOW DISCHARGE IN FLUIDIZED BEDS

[76] Inventors: Robert A. Frosch, Administrator of the National Aeronautics and Space Administration, with respect to an invention of Theodore Wydeven, Sunnyvale, Calif.; Peter C. Wood, San Jose, Calif.; Edward V. Ballou, Mountain View, Calif.; Leroy A. Spitze, Morgan Hill, Calif.

[21] Appl. No.: 88,663

[22] Filed: Oct. 26, 1979

[51] Int. Cl.³ .............................................. H05B 5/02
[52] U.S. Cl. .................................. 361/230; 239/690; 361/226
[58] Field of Search ............... 361/230, 231, 226, 227; 239/690, 142

[56] References Cited
U.S. PATENT DOCUMENTS

| | | | |
|---|---|---|---|
| 4,101,644 | 7/1978 | Ballou et al. | 423/581 |
| 4,161,765 | 7/1979 | Itoh et al. | 361/227 |
| 4,185,783 | 1/1980 | Lacchia | 361/213 X |

*Primary Examiner*—A. D. Pellinen
*Assistant Examiner*—L. C. Schroeder
*Attorney, Agent, or Firm*—Darrell G. Brekke; John R. Manning

[57] ABSTRACT

Static charges and agglomeration of particles in a fluidized bed system are minimized by maintaining in at least part of the bed a radio frequency glow discharge. This approach is eminently suitable for processes in which the conventional charge removing agents, i.e., moisture or conductive particle coatings, cannot be used. The technique is applied here to the disproportionation of calcium peroxide diperoxyhydrate to yield calcium superoxide, an exceptionally water and heat sensitive reaction.

8 Claims, 1 Drawing Figure

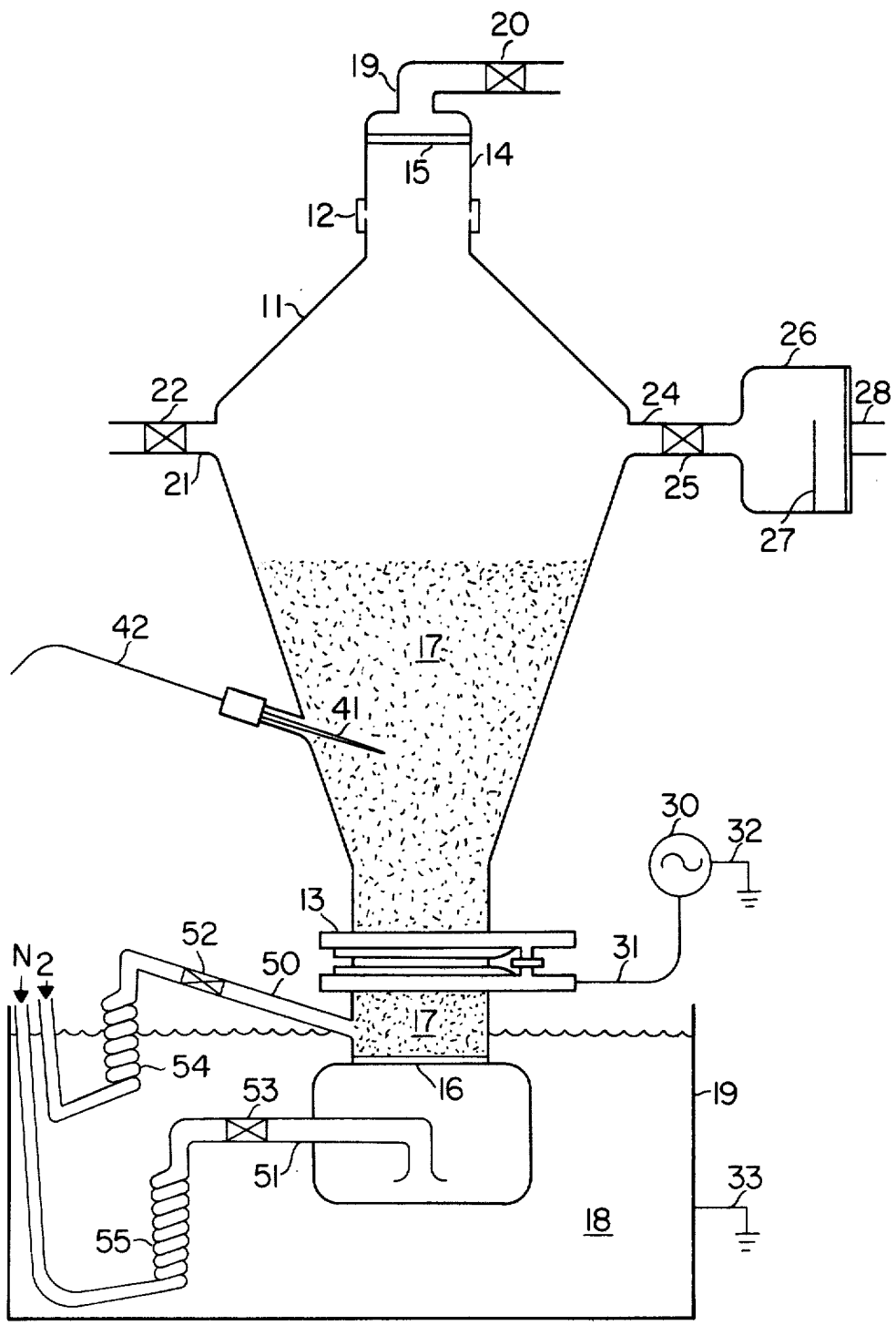

USE OF GLOW DISCHARGE IN FLUIDIZED BEDS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

This invention relates to the elimination of static charges in fluidized bed processes, and more particularly, in those where the introduction of moisture or of extraneous conductive particles is not desirable.

THE PRIOR ART

The problem of electrostatic charge in a fluidized bed is widely recognized and various approaches have been tried or suggested in order to eliminate the undesirable effects of this phenomenon. Yet, only two of the methods mentioned in the art seem reasonably effective in eliminating agglomeration, one of the effects of static charge on non-conductive fluidized powders with particle size ranges suitable for the types of chemical reactions commonly carried out in fluidized bed systems. These particular methods are (1) the use of high humidity in the fluidizing gas stream and (2) the addition of an agent, such as graphite, which coats the particles with a conductive surface layer [Bafrnec and Bena, Chem. Eng. Sci, 27, pp. 1177–81 (1972)]. The use of grounded and conductive walls in the apparatus has not seemed very effective [Shikov et al, Khim prom. 9, No. 1, pp. 57–9 (1977)], and neither have experiments with electron bombardment of particles agglomerated by electrostatic charges [Ithara, M. S. thesis, Dept. Chem. Eng., M.I.T. (1960)]. As to the application of high potential electric fields to various fluidized beds, e.g., glass beads, alumina powder, etc., it has produced agglomeration of the particles, presumably due to the enhancement of van der Waal forces with "surface polarization charges" and "induced mutual attraction of particles." Free charges from corona and associated effects were assumed to be negligible [Katz and Sears, Can. J. Chem. Eng. 47, pp. 50–53 (1969); U.S. Pat. No. 3,304,249].

Various types of radiation have been used to control or eliminate undesirable electrostatic charges on flat surfaces and in flowing liquids. For instance, U.S. Pat. No. 4,057,071 discloses an electrostatic charge remover wherein the charge produced by a non-conductive liquid flowing through a pipeline is reduced by gamma radiation. Okamoto et al, U.S. Pat. No. 3,851,230, remove residual static charge in a transfer printing process by exposing the appropriate surface to light. In U.S. Pat. No. 3,863,108, on the other hand, there is disclosed the control electric charge density on a surface, paper or thin polymer sheets, by means of an ion current generated by a corona discharge. Neither the method nor the apparatus involved, designed as they are for the reduction of charge on fast moving sheets of non-conductive material, can be applied to the reduction of powders in a flowing gas stream. In particular, no way is suggested to sense the surface charge and apply a bias voltage to particulate agglomerates, as the technique requires.

As to methods that have been described earlier as somewhat effective to reduce charges in fluidized beds, it should be kept in mind that there are numerous conventional treatments or uses of powders in which either contact with a humid gas stream or addition of particle coating material would be deleterious to the objective to be achieved by the fluidization process.

The principal object of the present invention, therefore, is to eliminate static charge agglomeration of particles suspended in a flowing gas stream for the purpose of undergoing or causing chemical or physical reactions, especially in situations where the gas stream functions as a means of thermal control and as a vehicle to convey vapor reactants or products to or away from the surface of the suspended particles.

STATEMENT OF THE INVENTION

The objects of this invention have been accomplished by carrying out a fluidized bed process in a fluidization apparatus equipped with radio frequency (RF) glow discharge or "plasma" generating components with adequate power to maintain a glow discharge in the fluidization chamber. During operation, a glow discharge is induced in the flowing gas which becomes a conductive medium capable of dissipating the charges on the suspended particles that cause the undesirable agglomeration.

BRIEF DESCRIPTION OF THE DRAWING

A better understanding of the invention and of the several advantages attendant thereto can be readily obtained by referring to the accompanying drawing which consists of a schematic representation of a fluidization apparatus equipped with radio frequency plasma generating electrodes.

DETAILED DESCRIPTION OF THE INVENTION

The removal of electric charges from solid particles suspended in a fluidized bed can be accomplished with a variety of apparatus that can be selected to accommodate the particular chemical or physical process that is being carried out. For the purpose of the present disclosure, however, the invention shall be described in terms of the preparation of calcium superoxide by the disproportionation of calcium peroxide diperoxyhydrate. Although both process and equipment shall involve parameters and design features intended to optimize this disporportionation reaction, it should be remembered that other reactions which can benefit from this fluidized bed technique may require adaptation of the present apparatus and technique that remain within the principles of the invention as claimed. With this in mind, the apparatus used shall now be described in detail.

An embodiment of a useful apparatus employed for the disproportionation of calcium peroxide diperoxyhydrate is illustrated schematically in the drawing. It consists of three main parts: a funnel-shaped reaction chamber 11, a small sample-transfer chamber 14, and a powder-knockout chamber 26. The reaction chamber 11 is connected to the sample-transfer chamber 14 by attaching means 12 and the assembly is provided with porous plates, e.g., fritted glass plates 15 and 16. The scale of the drawing is too small to show the porous nature of the plates. The assembled vessels 11, 14 and 26 are evacuated by means of a cryopump and a mechanical pump (not shown) through conduits 24 and 28, and bellows seal valve 25. Thermocouple probe 41 with tip submerged in fluidized solid particles 17 on plate 16, is connected via lead 42 to a reference junction and a temperature recorder (not shown). During operations, dry nitrogen gas is lead to chamber 11 through heat transfer coil 55, valve 53, and conduit 51. The gas then passes through porous plate 16 t create the turbulence necessary to suspend the particles of diperoxyhydrate and form a fluidized bed (17). The configuration of chamber 11 in terms of increasing internal diameters in an upward direction, is such that the velocity of the nitrogen stream is sufficiently decreased as it moves upwards so that a very small fraction of the suspended particles will be entrained into the powder-knockout chamber 26. The powder particles that reach chamber 26 will hit baffle 27 and settle on the floor of the chamber. Another gas conduit 50 with valve 52 and heat transfer coil 54 may be provided to deliver a minor portion of nitrogen into chamber 11 above porous plate 16. The lower portion of chamber 11 is submerged in cooling bath 18 which is generally maintained at a temperature of 20° C. A pressure port 21 is connected to a pressure gauge (not shown) through valve 22. Finally, transfer chamber 14 is connected to a nitrogen purge line 19 closed by valve 20.

The RF power necessary to carry out the neutralization of particle charges is supplied by an RF generator 30 connected by lead 31 to high voltage electrode 13 and grounded at 32. A power meter (not shown) and an impedance matching network (not shown) complete the RF generating system. The high voltage electrode used here has the form of an o-ring joint clamp 13 which also holds the upper and lower sections of reaction vessel 11 together. Liquid 18 in bath 19 serves as the ground electrode and is connected to earth by lead 33.

When operating, the level of liquid 18 in cooling bath 19 is kept just above porous plate 16 in the lower part of reactor 11. When RF is used, nitrogen gas is introduced only through inlet 51, inlet 50 being closed by valve 52.

In other runs that have not proved successful, a Tesla coil (not shown) has been used to ionize some nitrogen introduced through inlet 50, with the bulk of the nitrogen still being introduced to lower inlet 51.

The generation of an RF glow discharge can be accomplished by any commercial or privately made RF glow discharge or "plasma" generating equipment that has adequate power to bring about a glow discharge in the fluidization chamber. The electrode configuration which introduces the RF power to the chamber can also differ significantly from the arrangement shown in the drawing. One possibility involves a "glass cross" reaction chamber, as shown in FIG. 1 of U.S. Pat. No. 4,101,644, in which flat circular or rectangular electrodes are spaced in capacitative relationship and placed in such a manner that part of the fluidized bed is between said electrodes.

In addition to having a "glass cross" or a funnel shape, the reaction chamber may be cylindrical or have any other geometrical configuration that will allow a powder to be suspended in a flowing stream of gas. Size is not critical, but for a given process operation, practical limits are set by the volume of flowing gas needed and the size and power of the RF generator necessary to bring about a glow discharge in the given reaction chamber. It should also be noted here that although the terms "fluidization" and "fluidized bed" are used in describing the preparations disclosed in this specification, such preparations involved a partially fluidized bed, with much of the powder suspended in the gas stream. In any event, the use of RF discharge to reduce static agglomeration of small particles is applicable to the entire range of conditions in which the small particles are out of contact with each other part or all of the time due to buoyant effect of a flowing gas stream.

Although the RF power employed in the disporportionation of calcium peroxide diperoxyhydrate has been at the level of about 5 watts, higher power levels may be more effective in preventing agglomeration, especially in processes carried out at higher pressures. For the present application, it was desired to keep the particles isothermal at a temperature controlled by the temperature and flowrate of the incoming gas.

The pressure of the flowing gas in the process used for illustrative purposes was in the range of about 0.5 to 1.5 mm Hg. However, the RF glow discharge may be applied to suspended or fluidized particulate beds at higher pressures, up to, at best, atmospheric pressure. A pulsed discharge generator capable of supplying the power for an Rf glow discharge at atmospheric pressure has been described elsewhere [Donohoe et al., I & EC Fundamentals 16, No. 2, pp. 208–215 (1977)].

Any number of gases may be employed fo the particle bed fluidization process involving an RF glow discharge minimization or elimination of static agglomeration of suspended particles. For example, relatively inert gases such as helium, neon, and argon are suitable flow media. More reactive gasses may be employed for particular purposes, especially when a reaction between the dispersed powder and the gaseous species is anticipated or desirable. A partial list of such gasses includes oxygen, hydrocarbons, substituted hydrocarbons, metal vapors, metal-organic compounds, as well as mixtures of such gases with or without other gases. Gaseous streams may contain water vapor in the lower humidity ranges below those effective in alleviating agglomeration due to static charges, provided that the water vapor either does not harm the process or is desirable as a reactant. Higher humidity levels, where usable, preempt the use of RF glow discharge solely for the purpose of preventing static agglomeration of suspended particles. The selection of a fluid gas media should also ensure that the equilibrium vapor pressure of the flowing gas species be high enough at the temperature of the fluidizing chamber that a pressure can be maintained sufficient to support the suspended particles by the momentum from collisions with the flowing stream, high enough also the allow the initiation of the glow discharge, and high enough finally to preclude undesirable condensation. However, mixtures of gases and vapors may be employed to meet these operating requirements by increasing the total pressure of the fluid gas media and decreasing the partial pressure of a component.

As mentioned earlier, examples of the process of the invention shall now be given to illustrate the advantages of the use of an RF glow discharge in a fluidized bed operation. The examples all deal with the disproportionation of calcium peroxide diperoxyhydrate to yield calcium superoxide according to the following equation:

$$2\ CaO_2 2H_2O_2 \rightarrow Ca(OH)_2 + Ca(O_2)_2 + 3/2 O_2 + 3H_2O$$

This process has been disclosed in great detail in U.S. Pat. No. 4,101,644, which is incorporated into the present specification by reference. Scale-up of the patented process by means of the fluidized bed technique gave rise to various difficulties which have been solved by the application of an RF glow discharge to the system.

EXAMPLES 1 to 7

Several disproportionation runs were made with calcium peroxide diperoxyhydrate using the apparatus described in the drawing. In Example 1, no RF power nor high voltage field was used. In Examples 2 and 3, a Tesla coil was brought into contact with inlet 50 through which a minor proportion of the nitrogen, i.e., about 30%, was introduced into reactor 11. In the last four runs, Examples 4 to 7, all the nitrogen was introduced through inlet 51 and then subjected to a 5 W 13.56 MHz RF glow discharge by passage through activated electrode 13. Other variables of lesser significance for the purpose of this invention are noted in the following table along with the results obtained for the runs described.

All runs were carried out at 20° C. for 3 hours, with nitrogen used as the suspending gas. When RF power was applied, it was turned on immediately after starting the nitrogen flow and turned off after stopping the nitrogen flow.

CONDITIONS AND RESULTS FOR DISPROPORTIONATION OF
$CaO_2 \cdot 2H_2O_2$ IN REACTION CHAMBER SHOWN IN DRAWING

| Example | RF Glow Discharge | Linear Gas[1] Flow Velocity cm/sec | Gas Pressure mm Hg | Particle Diameter mm | Reactant Loading $g/cm^2$ | Product Purity % $Ca(O_2)_2$ |
|---|---|---|---|---|---|---|
| 1 | none | 310 | 1.0 | ≦0.30 | $2.1 \times 10^{-2}$ | [3] |
| 2 | none[2] | 206 | 2.0 | 0.15–0.30 | $4.1 \times 10^{-2}$ | 55.6 |
| 3 | none[2] | 260 | 3.0 | 0.15–0.30 | $2.3 \times 10^{-2}$ | [3] |
| 4 | 5W | 186 | 1.0 | 0.30–0.50 | $5.6 \times 10^{-2}$ | 63.5 |
| 5 | 5W | 186 | 1.0 | 0.30–0.50 | $1.0 \times 10^{-1}$ | 59.9 |
| 6 | 5W | 186 | 0.5 | 0.30–0.50 | $1.0 \times 10^{-1}$ | 55.8 |
| 7 | 5W | 186 | 1.5 | 0.30–0.50 | $1.0 \times 10^{-1}$ | 57.1 |

[1]Average linear velocity based on cross-sectional area of plate 16.
[2]Tesla coil used on inlet 50.
[3]No product collected for analysis due to agglomeration and adhesion to reactor walls.

In a previous disporportionation process which does not comprise any fluidization, RF, or Tesla component, a maximum purity of 67% $CA(O_2)_2$ could be obtained with a flowing nitrogen stream through a bed of reactant on a fritted glass disc at initial reactant loading of about $9 \times 10^{-3}$ gram per square centimeter of disc surface U.S. Pat. No. 4,101,644). When fluidization of the bed of reactant was attempted by increasing the nitrogen flow and the reactant loading in order to scale up the disporportionation process, the reaction observed was vigorous and, as indicated by the results of Example 1 in the table, no sample could be obtained for analysis because the material remained stuck to the reactor walls. As examples 2 and 3 have shown, attempts to use a Tesla coil to prevent agglomeration of particles and adherence of the products to the walls of the reactor did not succeed, although in one case (Example 2) sufficient material could be obtained for analysis. When an RF glow discharge was introduced into the system, however, the clumps of powder broke up and the particles became completely suspended into the medium. At the end of the reaction period, all the product could be easily moved to the transfer chamber and it did not appear to be statically charged. On analysis, the product showed a purity of 63.5% (Exmple 4) and this for a reactant loading 6 times as large as the best run of U.S. Pat. No. 4,101,644, i.e., $5.6 \times 10^{-2}$ as apposed to $9 \times 10^{-3}$ $g/cm^2$. Examples 5 to 7 illustrate the effect of variations in reactor gas pressures at a higher loading, namely $1.0 \times 10^{-1} g/cm^2$. In all these cases, no particle agglomeration was observed and all the product could be recovered.

To summarize these results, it has been established that the application of an RF glow discharge to a very heat and water sensitive chemical process carried out in a fluidized bed of reactant has eliminated the static charges that cause detrimental agglomeration of particles and adherence of reactant and product to the reactor walls. The results also indicate the feasibility of further increases in reactant loading, as well as the attainment of purity levels equalling and possibly surpassing those obtained by the static processes of the art.

Finally, from the observations made in the course of this work and because of the flexibility of the parameters and equipment design that are involved in the application of RF power to a reactor, it is believed that the man skilled in the art can utilize this technique in other systems, including fluidized beds, in which agglomeration due to electrostatic charges remains a problem.

We claim:

1. A process for the minimization of agglomeration of particles in a reaction chamber containing solid particulate material fluidized by a gas stream so as to produce a fluidized bed, said process comprising:
   (a) positioning first and second electrodes external of and near said reaction chamber;
   (b) applying radio-frequency power between said first and second electrodes to maintain a glow discharge in at least a part of said fluidized bed to dissipate electrostatic charges from the particulate material.

2. The process of claim 1 wherein said first and second electrodes each encircle a portion of said reaction chamber.

3. The process of claim 2 wherein the radio frequency employed is 13.56 MHz and the power is at least 5 watts.

4. The process of claim 1 wherein the gas stream comprises a gaseous component that can react with the particulate material.

5. In the process of disproportionating particles of calcium peroxide diperoxyhydrate in a reaction chamber, the improvement comprising:
   (a) injecting a stream of chemically inert gas upward through said particles to suspend particles and produce a fluidized bed;
   (b) positioning first and second electrodes external of and near said reaction chamber; and
   (c) applying radio-frequency power between said first and second electrodes to maintain a glow discharge in at least a part of said fluidized bed to dissipate electrostatic charges from said particles.

6. The process of claim 5 wherein the gas employed is nitrogen.

7. The process of claim 6 carried out at a temperature within the range of about 0 to 30° C. and at a gas pressure not greater than 5 mm Hg.

8. The process of claim 7 wherein said first and second electrodes each encircle a portion of said reaction chamber.

* * * * *